(12) United States Patent
Varadarajan et al.

(10) Patent No.: US 10,146,288 B2
(45) Date of Patent: Dec. 4, 2018

(54) ADAPTIVE POWER CONSUMPTION MANAGEMENT IN SMART DEVICES

(71) Applicant: Vigyanlabs Innovations Private Limited, Mysore (IN)

(72) Inventors: Srinivas Varadarajan, Mysore (IN); Srivatsa Krishnaswamy, Bangalore (IN)

(73) Assignee: Vigyanlabs Innovations Private Limited, Mysore (IN)

(*) Notice: Subject to any disclaimer, the term of this patent is extended or adjusted under 35 U.S.C. 154(b) by 91 days.

(21) Appl. No.: 15/469,507

(22) Filed: Mar. 25, 2017

(65) Prior Publication Data
US 2018/0232036 A1   Aug. 16, 2018

(30) Foreign Application Priority Data
Feb. 15, 2017   (IN) .............................. 201741005437

(51) Int. Cl.
| G06F 1/32 | (2006.01) |
| G06F 1/26 | (2006.01) |
| H04W 52/02 | (2009.01) |
| H04W 24/04 | (2009.01) |

(52) U.S. Cl.
CPC ............ *G06F 1/3209* (2013.01); *G06F 1/266* (2013.01); *G06F 1/3296* (2013.01); *H04W 24/04* (2013.01); *H04W 52/0219* (2013.01); *H04W 52/0235* (2013.01); *H04W 52/0251* (2013.01); *H04W 52/0258* (2013.01)

(58) Field of Classification Search
None
See application file for complete search history.

(56) References Cited

U.S. PATENT DOCUMENTS

| 5,905,900 | A | * | 5/1999 | Combs ................. G06F 1/3203 713/320 |
| 8,576,431 | B2 | | 11/2013 | Kato |
| 8,806,235 | B2 | | 8/2014 | Deakin et al. |
| 8,904,206 | B2 | | 12/2014 | Black et al. |
| 8,996,895 | B2 | | 3/2015 | Naveh et al. |
| 9,072,050 | B2 | | 6/2015 | Homchaudhuri et al. |
| 9,116,694 | B2 | | 8/2015 | Ooi |
| 9,134,784 | B2 | | 9/2015 | Locker et al. |
| 9,230,507 | B2 | | 1/2016 | Drader et al. |
| 9,609,544 | B2 | * | 3/2017 | Raleigh ............... H04L 41/0893 |
| 9,888,363 | B2 | * | 2/2018 | Addepalli ............. H04W 4/046 |

(Continued)

*Primary Examiner* — Candal Elpenord
(74) *Attorney, Agent, or Firm* — Rahman LLC

(57) ABSTRACT

A system including an intelligent power management device including a plurality of sub-devices, a communication component communicatively connect the device to a communication network, wherein an intelligent power management (IPM) agent is continually run on the device and is configured to save power consumption on the device based on a plurality of power management policies including power management actions for controlling power consumption of a sub-device, wherein the power management policy is received from a remote server, and wherein the IPM agent is configured to adaptively change, using historic usage data of a plurality of users of the intelligent power management device, the power management actions to optimize a power saving on the plurality of sub-devices for each of the plurality of users.

7 Claims, 7 Drawing Sheets

(56) References Cited

U.S. PATENT DOCUMENTS

| | | | |
|---|---|---|---|
| 2002/0178387 A1* | 11/2002 | Theron | G06F 1/32 |
| | | | 713/300 |
| 2011/0167286 A1* | 7/2011 | Varadarajan | G06F 1/3203 |
| | | | 713/323 |
| 2014/0101472 A1 | 4/2014 | Rohrweck | |
| 2014/0119195 A1* | 5/2014 | Tofighbakhsh | H04W 52/0251 |
| | | | 370/241 |
| 2015/0234441 A1* | 8/2015 | Jackson | G06F 1/3203 |
| | | | 713/300 |
| 2016/0291671 A1* | 10/2016 | Rider | H02J 13/0006 |

* cited by examiner

ADAPTIVE POWER CONSUMPTION MANAGEMENT IN SMART DEVICES

BACKGROUND

Technical Field

The embodiments herein generally relate to power management, and more particularly to optimizing power consumption of smart electronic devices.

Description of the Related Art

Modern Information Technology (IT) infrastructure elements such as desktops, laptops, tablets, smart phones, smart monitors, smart TVs, printers, network switches, storage area networks, firewalls have one or more built-in power management capabilities. These systems may allow the user to set various power management policies based on timeouts and inactivity. Typical examples include turning off a display after inactivity for a certain predefined time interval, or putting a computer to sleep after inactivity for a certain predefined time interval, or turning off a component of a device—like a network port, a sensor, etc. after inactivity for a certain predefined time interval.

Very often these timeout-based activities become intrusive, for example they may disturb user experience, and the user may not be able to set the optimal time intervals. In existing systems, the time-intervals are statically defined once and may not be the most appropriate for all usage scenarios and times.

Some versions of operating systems (OS) have introduced a concept called connected-standby in which few of the applications remain active on a device even when the system is in standby (or sleep mode). However, the connected standby is not supported on all hardware, many installations still use older versions of OS, and an upgrade requires a rewrite of legacy applications to handle connected standby.

Moreover, many IT infrastructure elements in enterprises have to be available 24/7 even though end-users are not actively using the system. With the currently available power management technologies, users' power policy set ups only turn the display off when the user is not actively inputting data, or the device subsequently goes to sleep if not used for a longer duration (sleep time). However, these existing standby policies cannot be used in 24/7 operations as the applications need to either run continuously or intermittently in the background when the system is not directly used by the user.

SUMMARY

In view of the foregoing, an embodiment herein provides a system comprising an intelligent power management device comprising a plurality of sub-devices comprising a central processing unit (CPU); a display device communicatively connected to the CPU; a main memory component accessed by the CPU; and a persistent storage connected to the memory component and accessed by the CPU; an operating system controlling the CPU; a communication component communicatively connected to the CPU and configured to connect the intelligent power management device to a communication network; a remote server communicatively connected to the communication network, wherein the operating system is configured to continually run an intelligent power management (IPM) agent, wherein the IPM agent is configured to save power consumption on the plurality of sub-devices based on a plurality of power management policies, wherein a power management policy of the plurality of power management policies comprise power management actions for controlling power consumption of a sub-device among the plurality of sub-devices, wherein the power management policy is received from the remote server over the communication network, and wherein the IPM agent is configured to adaptively change, using historic usage data of a plurality of users of the intelligent power management device, the power management actions to optimize a power saving on the plurality of sub-devices for each of the plurality of users.

The intelligent power management device may be configured to determine, using the IPM agent, that the sub-device is active when the IPM agent detects an interaction by any of the plurality of users with the sub-device, or is idle when the IPM agent detects no interaction by any of the plurality of users with the sub-device; and store, using the IPM agent, a plurality of records indicating the activeness and idleness for the sub-device in an interacting devices idle duration table, wherein the plurality of records comprises a duration of the activeness or idleness and any of a date, a time, a day, a geographic location, a time zone, a temperature, a humidity, a luminescence, a network signal strength, an electromagnetic field radiation, and energy consumption of the sub-device during the activeness or idleness.

The intelligent power management device may be configured to determine, using the IPM agent and the plurality of records in the interacting devices idle duration table, a plurality of timeouts for the sub-device, wherein a timeout of the plurality of timeouts indicates a value for a timer for the sub-device, and wherein when the timer reaches a predetermined time, a predetermined action of the plurality of actions from the power management policy occurs. The display device may be configured to display a value of the timeouts and the timer for the sub-device.

The intelligent power management device may be further configured to update, using the IPM agent, the value of the timeouts, and upon an overwrite by the user, to a value of an input received from the user. The sub-device may be configured to operate in multiple power states from P0 to PN, wherein N is an integer, P0 is a lowest power level, and PN is a highest power level corresponding to the sub-device, and wherein the IPM agent is further configured to move the sub-device to a power state from P0 to PN based on a plurality of sub-device dynamic performance demands and the records in the interacting devices idle duration table.

A sub-device performance demand of the plurality of sub-device performance demands may be determined using a performance demand table corresponding to an application running on the intelligent power management device, wherein the performance demand table may comprise a plurality of rows, wherein each row may correspond to an affected sub-device of the plurality of sub-devices, wherein the affected sub-device may be affected by the application, the row may comprise an application sensing parameter corresponding to the application and the affected sub-device, wherein the application sensing parameter may indicate a performance measure of the application; a sensing threshold corresponding to the application and the affected sub-device; a sampling interval configured to indicate a time to periodically sample and measure the application sensing parameter of the application on the affected sub-device; and an observation number indicating a number of continuous observations on the application during the sampling interval for measuring the application sensing parameter, wherein the power state of the affected sub-device may move to a higher power state when the application sensing parameter is higher than the sensing threshold, and wherein the power state of the affected sub-device may move to a lower power state when the application sensing parameter is lower than the sensing threshold.

An embodiment herein provides a method for intelligently managing a power consumption of a device comprising a plurality of sub-devices communicatively connected to a remote server, the method comprising continually running an intelligent power management (IPM) agent, wherein the IPM agent is configured to reduce the power consumption on the intelligent power management device based on power management policies, and wherein a power management policy of the plurality of power management policies comprise power management actions for controlling power consumption of a sub-device of the plurality of sub-devices; receiving the power management policies from the remote server over the communication network; gathering, by the IPM agent, a historic usage data of a plurality of users of the intelligent power management device; and adaptively changing the power management policies to optimize a power saving on the sub-device for each of the plurality of users.

The method may further comprise determining that the sub-device is active, when the IPM agent detects an interaction by any of the plurality of users with the sub-device, or is idle, when the IPM agent detects no interaction by any of the plurality of users with the sub-device; and storing, by the IPM agent, a plurality of records indicating the activeness and idleness for the plurality of sub-devices in an interacting devices idle duration table, wherein the plurality of records may further comprise a duration of the activeness or idleness and any of a date, a time, a day, a geographic location, a time zone, a temperature, a humidity, a luminescence, a network signal strength, an electromagnetic field radiation, and energy consumption of the plurality of sub-devices during the activeness or idleness.

The method may further comprise determining, by the IPM agent, using the plurality of records in the interacting devices idle duration table, a plurality of timeouts for the plurality of sub-devices, wherein a timeout of the plurality of timeouts may indicate a value for a timer for the sub-device, and wherein when the timer reaches a predetermined time, a predetermined action from the power management policies may occur. The method may further comprise displaying, using a display device, a value of the timeouts, and the timer for the sub-device; and updating the value of the timeouts, by the IPM agent and upon an overwrite by the user, to a value of an input received from the user.

The sub-device may be configured to operate in multiple power states from P0 to PN, wherein N is an integer, P0 is a lowest power level and PN is a highest power level corresponding to the sub-device, and wherein the method may further comprise moving the sub-device to a power state from P0 to PN based on a plurality of sub-device performance demands and the records in the interacting devices idle duration table.

The method may further comprise receiving a demand table from the remote server, the demand table comprising a sampling interval configured to indicate a time to measure a resource demand of an application using any of the plurality of sub-devices; an application sensing parameter configured to store the resource demand of the application; and a sensing threshold configured to trigger a change in the power state of each of the sub-device, wherein the power state of the sub-device may move to a higher power state if the application sensing parameter is greater than the sensing threshold; and wherein the power state of the sub-device may move to a lower power state if the application sensing parameter is less than the sensing threshold; and determining each of the plurality of sub-device performance demands using the demand table corresponding to each of the plurality of sub-devices.

An embodiment herein provides a method for managing a power consumption of an intelligent power management device running a plurality of independent applications, wherein the intelligent power management device comprises a plurality of sub-devices, the method comprising creating an Application Sensor Table (AST) for the plurality of applications; creating a plurality of rows in the AST, wherein a row of the plurality of rows corresponds to an application of the plurality of applications and an affected sub-device of the plurality of sub-devices; and creating a plurality of columns in the AST, the plurality of columns comprising a first column corresponding to a power management action on the affected sub-device; a second column corresponding to a regular standby permission indicating whether the power management action is permitted to comprise a regular standby mode; and a third column corresponding to an active standby permission indicating whether the power management action is permitted to comprise an active standby mode, wherein the active standby mode allows the affected sub-device to continue operating in a permissible minimal power state without allowing any of the plurality of applications to terminate, and wherein the permissible minimal power state for the affected sub-device comprises a maximum of a plurality of minimum power states for the affected sub-device allowed by each of the plurality of applications.

The method may further comprise receiving a predetermined timeout for the affected sub-device from a user of the intelligent power management device; and configuring the affected sub-device to enter the active standby mode after the timeout, when the active standby permission permits the power management action to comprise the active standby mode and when the regular standby permission does not permit the power management action to comprise the regular standby mode.

The method may further comprise receiving a predetermined timeout for the affected sub-device from a user of the intelligent power management device; and configuring the affected sub-device to enter the active standby mode after a predetermined time delay after the timeout provided the active standby permission column permits the affected sub-device to enter the active standby mode when the active standby permission permits the power management action to comprise the active standby mode and when the regular standby permission does not permit the power management action to comprise the regular standby mode.

The method may further comprise configuring the affected sub-device to enter the active standby mode when a battery level of the intelligent power management device is below a predetermined threshold when the active standby permission permits the power management action to comprise the active standby mode and when the regular standby permission does not permit the power management action to comprise the regular standby mode. The method may further comprise receiving a use schedule for the affected sub-device from a user of the intelligent power management device; and configuring the affected sub-device to enter the active standby mode outside the use schedule provided the active standby permission column permits the affected sub-device to enter the active standby mode when the active standby permission permits the power management action to comprise the active standby mode and when the regular standby permission does not permit the power management action to comprise the regular standby mode.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
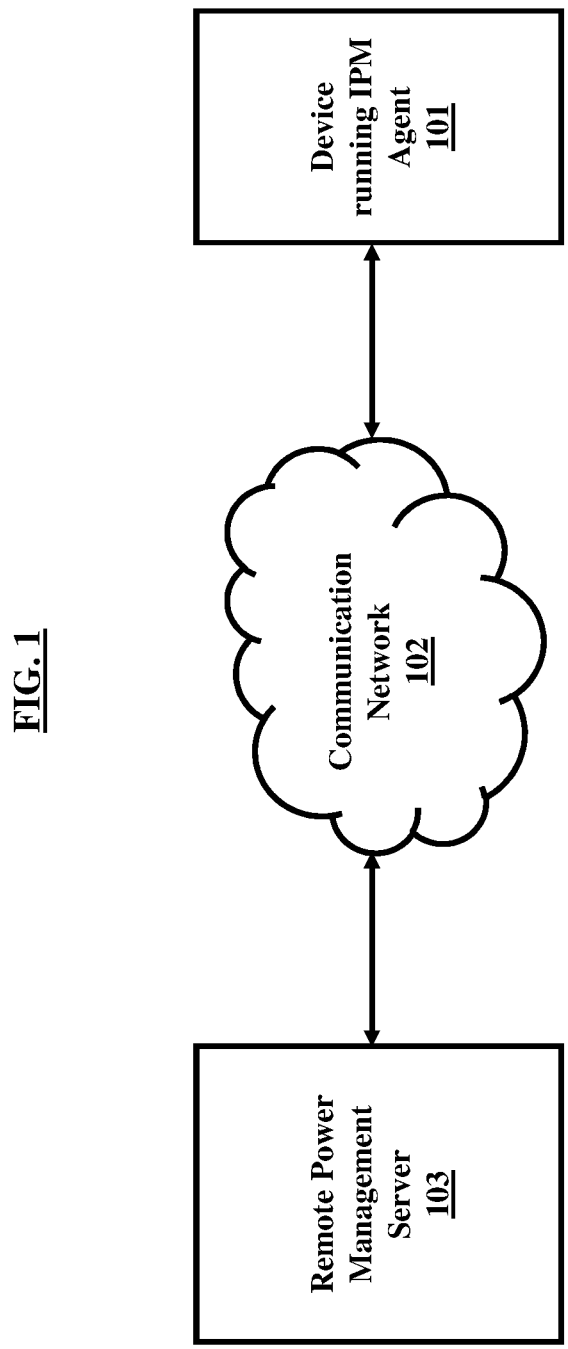
FIG. 1 is a schematic diagram illustrating a power management system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Intelligent Power Management (IPM) provides for optimizing the timeout associated with IT devices for achieving higher energy savings by the devices without negatively impacting user experience.

As used in the embodiments herein, IT infrastructure includes smart devices including any of desktops, laptops, tablets, smart phones, smart monitors, smart TVs, printers, network switches, storage area networks, firewalls, etc. A system may refer to a smart device such as a PC that runs the IPM agent. A device or a device component idleness may refer to lack of significant activity associated with user's interactions directly with the device or interaction that impact device components. A device idle time duration may refer to an unbroken time duration associated with idleness of the device. Idleness may also be referred to as inactivity.

Moreover, as used in the embodiments herein, range of idle time durations may refer to a range bounded by a minimum time duration and a maximum time duration, e.g. 1 min to 10 mins, or 15 mins to 60 mins according to an exemplary embodiment. The system may use various timers, and timeouts may take place when time expires on these timers. Timeouts may be associated with the beginning of user inactivity, in some embodiments herein. An idle timeout may occur when a time limit is set on the duration of idleness and the duration is exceeded.

Furthermore, as used in the embodiments herein, device power consumption may refer to an instantaneous power consumed by a device, for example expressed in watts. Device energy consumption may be referred to as the energy consumed by the device over a period of time, for example expressed in watt-hours. Standby may refer to a state of the system in which all computing tasks (other than a minimal set of services) are suspended and the system is in a low power consumption state. A system may be programmed to go into standby state upon the idle timeout exceeding a predetermined value.

Standby may abruptly end or suspend ongoing tasks such as a file download, or may break connection to a remote server. As used in the embodiments herein, an active standby may refer to a state of the system in which the system is active and not in standby, but the goal is to minimize power consumption of the system in this state.

As used in the embodiments herein, power management actions refer to built-in functions or IPM agent's functions that control the way power is consumed. For example, it could include any of turning a monitor off/on, reducing/increasing the frequency of a CPU, and turning a core of CPU off/on. These actions may be configurable by the OS or programmed into the IPM agent.

In the embodiments herein, containers may be used for efficient virtualization as compared to the traditional virtual machine. A container wraps application software with everything they need to run, such as a file system, code, runtime, system libraries, system tools, etc. A container provides isolation for the application's running on a server operating system, while minimizing the overheads of virtualization. As used in the embodiments herein, Dev-Act-Obs-Durn refers to the duration during which a device's activity is observed by sampling many times.

In the embodiments herein, a device's parameter such as capacity utilization is observed as a measure of device's activity, from a power management perspective, using an Application Sensing Parameter (ASP). An application sensor refers to a structure, for any user's important applications running in the system, that describes what power management actions are allowed when timeouts take place. The Application Sensors Table (AST) refers to a table where each row stands for an application sensing parameter.

In the embodiments herein, the dependency of the IPM agent on the various power states of the IT device and its component is also considered. Various timeouts may adaptively change in every system that runs the IPM agent, based on data collected using basic machine learning techniques.

An embodiment herein provides a self-learning IPM to optimize power consumption of an IT device. In an exemplary embodiment, the IT device includes any of a central processing unit (CPU), a display device, a main memory component accessed by the CPU, a persistent storage connected to the main memory component and accessed by the CPU, one or more communication components for connecting to different communication networks. An OS may control at least one computing device operated by the CPU. The computing device (or system) may run a program including an IPM agent all the time.

In an embodiment herein, the IPM agent saves power consumption on the device based on user defined power management policies. Each such policy defines parameter values and power management actions to control power consumption of the components of the device. The policies can be defined on the system locally or received from a remote server, and the system can learn from the usage data, and adaptively change the power saving policy on the device to optimize the power saving on the system. The device communicates with a remote server over a communication network to receive commands and send responses.

In an embodiment herein, the IPM agent observes and records the usage and idle patterns of other peripheral devices used by the user and interacts with the system. The peripheral devices include any of the input/output devices such as keyboard/mouse, biometric-sensor, camera, touch screen display, pen/stylus, voice sensor, motion/proximity sensor, and thermal sensor. When the user is interacting through any of the input devices, the system is active. When the input to the system is idle, which may occur when there is no user interaction with the system using any of the peripheral devices, the system is on standby or is switched off. The associated time interval during such idleness is referred to as input idle duration or user inactivity duration.

In an embodiment herein, system idleness is further refined using states such as the states when the system is running without user activity, when the system is on a standby mode, and when the system is switched off. Each activity/inactivity record may include any of the date, time, and day of the week, geographic location, time zone, temperature, humidity, luminescence, network signal strength, EMF radiation, energy consumption, and duration of inactivity. In an embodiment herein, each such record is a row in an interacting devices idle duration table (Inp-Idle-Durns-Tbl). Table I illustrates an Inp-Idle-Durns-Tbl according to an exemplary embodiment herein.

In an embodiment herein, the Inp-Idle-Durns-Tbl may have many rows where each row represents a record including any of:
a) date & start time
b) time zone(TZ)
c) day of the week(DOW)
d) geographic location (Geo Locn)
e) energy consumption (Energy Cons)
f) type of idleness—Idle/Standby/PowOff (Idle Type)
g) duration of inactivity/activity(Duration)
h) temperature (Temp)
i) humidity (Humid)
j) luminescence (Lum)
k) network signal strength (Net sig)
l) EMF radiation (EMF).

In an embodiment herein, the values in fields (h) to (1) are optional. Also, an Idle duration row in the Inp-Idle-Durns-Tbl table may imply that all the interacting devices are simultaneously idle during the duration.

In an embodiment herein, the summarized data of individual idle duration records may also be stored in an input idle duration summary table (Inp-Idle-Durns-Sum-Tbl). Each row in the Inp-Idle-Durns-Sum-Tbl also includes date, day of the week, a time-slot of the day expressed as 'start-hour to end-hour' in the form of (T1-T2), (T2-T3), (T3-T4), (T4-T6) and so on, for collecting idleness durations starting anytime during the Time-slot. In an embodiment herein, T1, T2, T3 etc. are the starting time of any duration and T2, T4, T6 are the ending time of the same (i.e. corresponding) duration, wherein all such recorded inactivity durations are further summarized under multiple timeslots of a day, and any recorded inactivity duration belongs to one such range. Each such range of time duration may be a row in Inp-Idle-Durns-Sum-Tbl, and each such row may also include all the idle durations that started during the time duration such as T1-T2. Each such row may also have the sum of all such idle durations and the total count of all such durations. Table II illustrates an Inp-Idle-Durns-Sum-Tbl according to an exemplary embodiment herein.

TABLE II

Input Idle Duration Summary Table (Inp-Idle-Durns-Sum-Tbl)

| Date (dd//mm/yyyy), Recording Time-slot start hour: end hour, Day of the week | Idle Duration Range | Idle Records Total num and (Durations) | Sum of all Idle Durations in the range (minutes) |
|---|---|---|---|
| 01/07/2016, 09:11, 5 | 0-5 minutes | 5 (2, 3, 3, 4, 5) | 45 |
| 01/07/2016, 09:11, 5 | 5-10 minutes | 3 (6, 7.9) | 12 |
| 01/07/2016, 09:11, 5 | 10-20 minutes | 1 (17) | 11 |
| 01/07/2016, 11:13, 5 | 5-10 minutes | 4 (6, 8, 9, 10) | 24 |
| 01/07/2016, 11:20, 5 | 10-20 minutes | 2 (11, 16) | 22 |
| . . . | . . . | | |
| 02/07/2016, 12:13, 6 | 120-480 minutes | 1 (426) | 426 |

The IPM agent running on the system may further include another function or method to track the input idleness as it occurs in real-time for executing predefined power management actions on the system's devices. In an embodiment herein, a set of input inactivity (or idleness) timeouts may be defined starting from the beginning of input inactivity. Alternatively, an input inactivity timeout may be defined as relative to another inactivity timeout that has already occurred. When the input idleness timeout occurs, a set of predefined or preconfigured power management actions on system's devices and sub-devices are executed. Such timeouts and associated power management actions may be defined for each of the one or more timeslots (or intervals) that divide a 24 hour day as part of power management policies by a user of the system. A user interface may be used to specify timeout values for different timers and associated power management actions that are made available by the OS and also by the IPM agent.

In an embodiment herein, the IPM agent running on the system may further include a machine-learning based func-

TABLE I

Header of the Interacting Devices Idle Duration Table (Inp-Idle-Durns-Tbl)

| RecID | Date | Start Time | TZ | DOW | Geo Locn | Energy Cons | Idle Type | Duration | Temp | Humid | Lum | Net Sig | EMF |
|---|---|---|---|---|---|---|---|---|---|---|---|---|---| tion or method for periodically updating the above timeouts based on user inactivity, wherein the timeouts are updated (or computed) using recorded runtime data available in the Inp-Idle-Durns-Sum-Tbl. A day may be divided into one or more observation intervals and user inactivity duration data is collected during all the observation intervals of a day. Data collected for a last predetermined number of intervals may be saved as limited historical data. At the end of an observation interval, the latest data collected is used along with a part of the historical data from previous observation intervals to form a working data set S.

In an embodiment herein, based on the finalized data set S, the new timeout values for all timers such as the display timer, standby timer and any others are predicted to be used in the system during the next observation interval. For any timer such as, for example, the display timer or standby timer, if a count of all durations in S that are greater than the current timeout value of the timer divided by a count of all durations in S that is greater than the proposed lesser new timeout value for the timer, is greater than a configurable $Threshold_1$, then the current timeout is changed to the lesser new timeout value for the timer. If a timer cannot be reduced and if a count of all durations in S that are greater than the current timeout value of the timer divided by a count of all durations in S that is greater than the proposed new greater timeout value for the timer, is greater than the configurable $Threshold_2$, then the current timeout is changed to the new higher timeout value for the timer.

In an embodiment herein, the IPM agent includes a method for using multiple power states of various devices and sub-devices of the system to balance power consumption and the required device performance level at any time. Parameters for various devices and sub-devices can be controlled by the IPM agent to optimally control power consumed in the device without hindering the expected performance of the device at any time of usage of the system. These parameters may be manufacturer and OS specific. The sub-devices may be any of CPU/Core, GPU, Hard Disk, Wi-Fi Port, USB Port, Display, and Ethernet Port. Each power manageable device or sub-device may have multiple power states: P0-PN, where P0 is the OFF state/lowest power state, PN is the highest power and performance state, and the states P0 to PN represent increasing power consumption and performance levels for the device.

The number of available power states is specific to every device and OS, wherein for a device D in power state P(K), when performance demand on the device D increases, the device D is moved to a power state P(K+1) which is the adjacent higher power and performance state. Similarly, when performance demand decreases on the device D, then it is moved to a power state P(K−1) which is the adjacent lower power and performance state. The system may also determine (or learn) the lowest power state at which a sub-device such as a CPU or a communication port or hard disk can operate without crashing any application in the AST.

IPM agent may include a method for periodic sensing of an application's activity level on devices/sub-devices of the system. The application is said to be active if it is consuming a device capacity beyond some threshold value. To decide how active an application is, an ASP based rules table is created for any of containers, applications, tasks, and activities running in the in the system. Each row of this table corresponds to an ASP of a device and its sub-devices in the system.

Each row of the ASP based rules table includes a simple rule corresponding to its ASP in the first column, a sensing threshold in the second column, a sampling interval in the third column, and a number of continuous samples in the fourth column. There may be as many rows as necessary in the ASP rules based table to correspond to the parameters belonging to the power manageable devices and sub-devices such as CPU, CPU/Core, hard disk, etc. A Device-Activity-Observation-Duration (Dev-Act-Obs-Durn) row for an ASP is created and includes the sampling interval times the number of continuous samples.

In an embodiment herein, to evaluate an ASP based rule, the ASP is sampled after every sampling interval and is compared with its sensing threshold value. An application is set to be less-active for this ASP if such a rule evaluates to false for all the number of samples that occur during Dev-Act-Obs-Durn. At a sampling interval and with respect to a specific device, an application can be found to be at an activity level such as a less-active level (parameter value is below a first value, for example below 50% of sensing threshold value), a normally-active level (parameter value between the first and a second value, for example between 50% and 80% of sensing threshold value), or a very-active level (parameter value is more than the second value, for example by more than 80% of sensing threshold value).

The IPM agent may include a machine-learning based method of adaptive power consumption optimization for the devices and sub-devices. Each system application that has an entry in the AST is evaluated at the end of each of its sampling intervals for each ASP, and its activity level is computed as described above. Any application that shows less activity corresponding to an ASP permits the device having the ASP to move to a next-lower-power-state that can also deliver the required lower performance level. An embodiment herein uses a device power state transition chart that includes transition rules and events corresponding to transition among the activity levels for the application under consideration.

In an embodiment herein, if every application in AST shows lower activity level for an ASP that is common to all the applications, the device having that ASP can be moved to a next lower power state. In this situation, the next lower power state is computed as the maximum of the set of a lower power states corresponding to all the applications. If at least one of the applications under consideration has normal or very high activity level for the ASP on the device, then if the computed average of the actual capacities used by applications is greater than a pre-configured threshold percentage (for example 70%) of the maximum capacity of the device in its current power state, then a higher activity level event is generated for the device and the next higher power state for the application is determined using the device power state transition chart to meet the required performance level satisfying all applications.

In an embodiment herein, when a device is moved to a lower power state, the corresponding sensing threshold value is decreased for the device's application parameter (for example Wi-Fi throughput rate threshold is reduced) for all applications, in proportion to the expected drop in performance due to lower power supplied to the device. Similarly, as soon as the device is moved to a higher power state, the corresponding sensing threshold value is increased for the device's application parameter (for example Wi-Fi throughput rate threshold is increased). The increase may be in proportion to the expected increase in performance due to the higher power supplied to the device.

The IPM agent may include a method for putting the system in deep power saving mode while the system continues to be active. As used in the embodiments herein, this mode is referred to as the active standby mode. An additional column indicating whether active standby is allowed for a device may also be included in the AST. Any application that permits active standby may allow the device to run in minimal but active power state. During active standby, the power savings may be achieved without shutting down the device or any user or network applications. In the AST, another column may be introduced indicating allowing of active standby instead of normal standby for the device. The applications mentioned in the AST with active standby enabled may continue to be active at lower performance levels. All the devices and sub-devices may be active but in work in a minimally allowed power state.

A device may enter the active standby mode immediately after any of a preconfigured timeout used to turn off the device, or standby timeout used to cause the device to go to sleep. The device may also enter the active standby mode when the battery level in the system goes below a threshold such as 10% with no external power source available, or immediately after a system generated event such as 'lock screen' occurs, or based on a user defined schedule. The user may schedule the device to either enter the active standby mode or come out of the active standby mode to the normal mode at any time. The device may also exit the active standby mode when an event is generated by a different system that is communicating with an application running on the device.

The IPM agent may include a self-learning method for automatically creating the AST in the system. For user applications running on the device, the IPM agent observes the resource consumption pattern of the user application on resources such as any of CPU, input devices, display device, network communication ports, and hard disk. The resource consumption data may be collected over a configured period of time and the data may be collected for working and nonworking days of week. Based on this historical data the IPM agent may perform statistical inference or frequentist inference and determine power management actions such as any of display dim, display on/off, device standby, and disk on/off for different time intervals of the day.

An embodiment herein uses two types of timeouts namely, display timeout and standby timeout. An embodiment herein uses and generalizes these two timeouts to more timeouts specified by user in any system, such as hibernate timeout or any timeout that is set to occur between the beginning of user inactivity (t=0) and standby timeout. Referring now to the drawings, and more particularly to FIGS. 1 through 6, where similar reference characters denote corresponding features consistently throughout the figures, there are shown exemplary embodiments.

FIG. 1 is a schematic diagram illustrating a system 100, according to an embodiment herein. In an embodiment herein, an IPM agent running on a device 101 saves power consumption of the device 101 and communicates with a remote power management server 103, using a communication network 102. The IPM agent receives power policies from and reports power savings to the remote power management server 103. In an exemplary embodiment, the device 101 is any of a personal computer, a smart IT device, or a data server.

Figure 2:
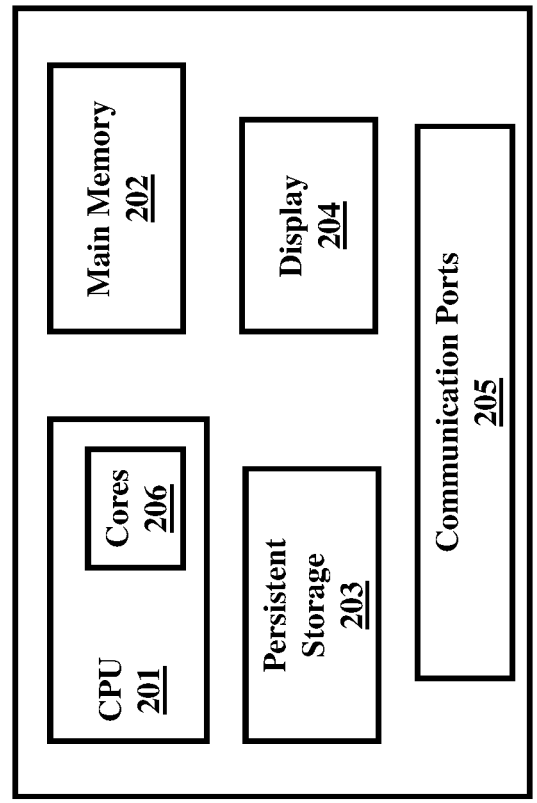
FIG. 2 is a schematic diagram illustrating a device used for power management according to an embodiment herein.

FIG. 2, with reference to FIG. 1, is a schematic diagram illustrating sub-devices of the device 101, according to an embodiment herein. The device 101 may include a CPU 201 having multiple cores 206, a main memory 202, a persistent storage 203, a display 204, and communication ports 205. In an embodiment herein, the API agent is configured to control the power consumption of the sub-components of the device 101 as illustrated in FIG. 2.

In an embodiment herein, a power management server 103, via communication network 102 and using a secure communication protocol, communicates with the IPM agent running on the device 101. This communication may occur when the IPM agent is in a connected mode and provides a non-intrusive monitoring function on the device 101. The IPM agent may operate in both a connected and disconnected mode, and maintains a list of applications, tasks, and activities running on the device 101, and their dependency on power manageable sub-devices in the device 101. An application control framework may define a set of non-intrusively controllable parameters for every application (that is considered important and is indicated as such by the user) on the device 101 and its sub-devices explained in FIG. 2 earlier. The application control framework may also define a usage level for every such parameter, for every application running on the device 101 to allow fine grain control. A management station, such as the remote power management server 103, sends a set of monitoring commands to the IPM agent to monitor the intrusiveness of a power management function on the device 101 without enforcing any power management.

Table III below shows some of the parameters for various devices/sub-devices that can be controlled by the IPM agent to optimally control power consumed in the device 101 without hindering the expected performance of the device 101 at any time during the operation of the system 100. Note that these parameters may be manufacturer and OS specific.

TABLE III

Controllable parameters of sun-components of the device

| Device/Sub-device | Parameter | Example |
|---|---|---|
| CPU | Min allowed frequency as a percent of Maximum CPU frequency | 20% of 2.4 GHz |
| | Max allowed frequency as a percent of Maximum CPU frequency | 90% of 2.4 GHz |
| | Min measured CPU utilization before frequency can be reduced | 20% |
| | Max measured utilization before frequency can be increased | 70% |
| | Measurement interval for monitoring utilization | 500 milliseconds |
| CPU/Core | Core On/Off | |
| | Maximum number of Cores allowed for computing as percentage of maximum number of available cores | 100% |
| | Minimum number of Cores allowed for computing as percentage of maximum number of available cores | 25% |
| | Maximum Core utilization threshold before adding cores | 45% |
| | Core Utilization monitoring interval | 500 milliseconds |
| GPU | Frequency | 500 MHz |
| Wi-fi port | On/off, power supplied to the chip, scan frequency, scan on/off | 1 Scan/minute, 50% power |
| USB port | On/off | |
| Display | Brightness, on/off | 70% |
| Hard Disk | On/Off | |

As shown in the exemplary embodiment of Table III, parameters of the device 101 and its sub-components should be set to appropriate values for fine grain power management of the device 101.

Each power manageable sub-device of the device 101 has multiple power states, denoted as P0-PN, where P0 is the OFF state/lowest power state, and PN is the highest power and performance state. The number of power states available is specific to every sub-device and the OS running on the device 101. If a sub-device D is in a state PK, then if performance demand increases, the sub-device D can be put in state P(K+1) which is the adjacent higher power and performance state. Similarly, when performance demand decreases on the device D, it can be put in state P(K−1) which is the adjacent lower power and performance state. Table IV illustrates fine grain dependencies of a container, application, task, or activity with respect to each of the power manageable sub-components of the devices, according to an exemplary embodiment herein.

TABLE IV

Fine grain dependencies and manageable power states of sub-components of the device

| Power Manageable Component/Device | Manageable Power/Performance states |
|---|---|
| CPU/Cores | P0, P1, P2, . . . , PN |
| GPU | P0, P1, P2 |
| Other Co processors | P1, P2 |
| Hard Disk | P0, P1, P2 |
| Monitor/Display | P0, P1, P2, P3, . . . , PN |
| Ethernet Lan Ports | P0, P, P2 |
| Other Network Ports | P0, P1, P2, P3, P4 |
| Wireless Lan Ports | P0, P1, P2, P3, P4 |
| USB Ports | P0, P1, P2 |
| DVD Drives | P0, P1, P2 |
| Tape Drives | P1 |
| Other Peripherals | P0, P1 |
| System State | P0, P1 |
| Video Device | P0, P1 |
| Audio Device | P0, P1 |
| Other Storage Devices | P2 |
| Cooling Fans | P0, P1, P3 |
| Memory Controllers | P0, P1 |

The device 101 may also determine (or learn) what is the lowest power state at which a sub-device, such as the CPU 201, the communication ports 205, or the persistent memory 203 can operate without crashing any application under consideration. In an embodiment herein, such learning can be done using the following steps:

(a) Observing applications using the device 101 and its sub-devices over a long period of time and determining their average, min and maximum utilization. In an embodiment herein, utilization is expressed as a percentage of maximum capacity of the device.

(b) IPM agent will do the following sub-steps for each application:
  a. Learn minimum performance requirements from various devices for each important application, as defined by the user.
  b. Find matching power states Px for each device as in Table IV given the expected performance level from the device.
  c. Suspend or lower the runtime priority for other applications so that they just run and do not consume too much of device capacity.
  d. The important application is run for a few hours to ensure that it doesn't terminate and remains active.
  e. If the application terminates due to a performance problem, the IPM agent the higher power state for the device and rerun the application. The IPM agent repeats this process until the application doesn't terminate.

(c) At the end of step (b) each application has a minimum tolerable power state. This information is useful while performing runtime evaluation of application sensing parameters or putting the system in active standby state, as further described below.

Table V illustrates a device capacity utilization per user application and corresponding tolerable minimum power state on the device, according to an exemplary embodiment herein.

TABLE V

Utilization capacity of each sub-component of the device

| Application | Device | Minimum Utilization | Maximum Utilization | Average Utilization | Allowed Minimum Power State |
|---|---|---|---|---|---|
| App1 | CPU | 0.1 | 0.6 | 0.3 | P3 |
|  | Wi-Fi | 0.0 | 0.4 | 0.2 | P0 |
|  | Disk | 0.3 | 0.8 | 0.5 | P2 |
|  | . . . | . . . |  |  |  |
| App2 | CPU |  |  |  |  |
|  | . . . |  |  |  |  |

When a particular application is running on the device, the IPM agent may be instructed to control the devices without affecting user experience or the expected behavior from the particular application. This is accomplished using an Application Sensor Table (AST). Table VI shows application sensors to achieve fine-grain power management, according to an exemplary embodiment herein.

TABLE VI

Application Sensor Table for power management

| Container/Application/Task/Activity Name | Interactive Yes/no? | Sensor Enabled? Yes/No? | Dim Monitor? | Turn-off monitor? | Turn-off Hard disk? | Standby Allowed? | Hibernate allowed? | Active Standby allowed? | Shutdown allowed? |
|---|---|---|---|---|---|---|---|---|---|
| Powerpoint.exe | Yes | Yes | No | No | Yes | No | No | Yes | No |
| Chrome.exe | Yes | No | Yes | Yes | Yes | Yes | Yes | Yes | Yes |
| Outlook.exe | Yes | No | Yes | Yes | Yes | Yes | Yes | Yes | No |
| Vlc.exe | Yes | Yes | Yes | Yes | Yes | No | No | No | No |

Table VI further illustrates a list of applications, tasks, and activities in the device that are sensitive to power management of system sub-devices, according to an exemplary embodiment herein.

An embodiment herein provides a method for automatically creating ASPs by observing the runtime behavior of applications. For example, Table VI may indicate that the device is allowed to be active, but consumes minimal possible power. An application is active if it is consuming a device or a sub-device capacity beyond a predetermined threshold value.

In an embodiment herein, referring to the Table III above, a device may have programmable parameters for power management. Table VII illustrates structured format for storing information on programmable parameters and power consumption. The structured format may be used to decide how active an application is. In an embodiment herein, one such table is created for any of a container, application, task, and activity in the system.

TABLE VII

Application Sensing Parameter based rule structure format

| Application Sensing Parameter | Sensing Threshold | Sampling Interval | No. of Continuous Samples |
|---|---|---|---|
| Process % CPU Usage | 20% | 100 milli-sec | 4 |
| Process % GPU Usage | 30% | 1 Sec | 5 |
| Ethernet I/O rate | 10 KB | 1 Sec | 5 |
| Disk I/O rate | 20 KB | 5 Sec | 3 |
| Audio I/O rate | 1 KB | 30 sec | 5 |
| Video I/O rate | 20 frames | 10 Sec | 10 |
| WiFi I/O rate | 10 KB | 1 Sec | 5 |
| USB I/O rate | 10 KB | 1 Sec | 5 |
| Number of Open Files | 5 | 30 sec | 3 |
| Amount of Memory Usage | 2 GB | 30 sec | 5 |
| Open network Connections | 5 | 30 Sec | 5 |
| Number of Dependent Tasks | 4 | 30 Sec | 3 |

In the Table VII, each device has a row with its own ASP. Each row further creates a simple rule corresponding to its ASP (column 1), and its sensing threshold (column 2). As seen in the Table VII, the parameters may belong to different power manageable sub-devices such as CPU, disk, etc. To evaluate a simple rule, its ASP is compared with its sensing threshold by sampling the value of the parameter at a repetitive sampling interval (column 3).

The Device-Activity-Observation-Duration (Dev-Act-Obs-Durn) is calculated by multiplying the sampling interval with the number of continuous samples, and is stored in a fourth column in the same row corresponding to an ASP. An application is referred to less-active on a device if and only if the simple rule, created in each row for the device, evaluate to false, during the entire Dev-Act-Obs-Durn.

At a sampling interval, with respect to a device, an application can be found to be:
less-active (in an exemplary embodiment, parameter value is below 50% of sensing threshold)
normally-active (in an exemplary embodiment, parameter value is 50-80% of a sensing threshold), or
very-active (in an exemplary embodiment, parameter value is 80% and above of the threshold).

Similar rules can be written for a container after identifying its sensing parameters from a power management perspective and corresponding thresholds. Applications specified in application sensors are evaluated at every sampling interval as described in Table VII. After the evaluation, at a sampling interval tick for some device and for some application, the results for all applications are collected in a Table VIII as shown below. The exemplary embodiment illustrated in the Table VIII, assumes there are only 3 applications App1, App2 and App3 that are important to the user.

TABLE VIII

Application Sensor Parameters evaluation results

| Application | CPU activity and % max capacity used | GPU activity? and % max capacity used | ... | Wi-fi activity? and % max capacity used | ... |
|---|---|---|---|---|---|
| App1 | Normally Active, 60% | Less-Active, 10% | | Less-Active, 10% | |
| App2 | Less-Active, 20% | Less-Active, 20% | | Less-Active, 0% | |
| App3 | Very Active, 85% | Normally Active, 50% | | Less-Active, 0% | |

For example, according to the evaluation results as presented in the Table VIII, Wi-Fi can be moved to the next lower power state, say P2 or P1, provided the applications App1, App2, and App3 allow it. The next allowed lower power state for the Wi-Fi device is the maximum of next-lower-power-state(App1), next-lower-power-state(App2), and next-lower-power-state(App3). The minimum power states for applications App1, App2 and App3 are derived from Table V. For example, if App1 and App2 allow state P1 but App3 doesn't allow P1 then the device's power state is unchanged.

Figure 3:
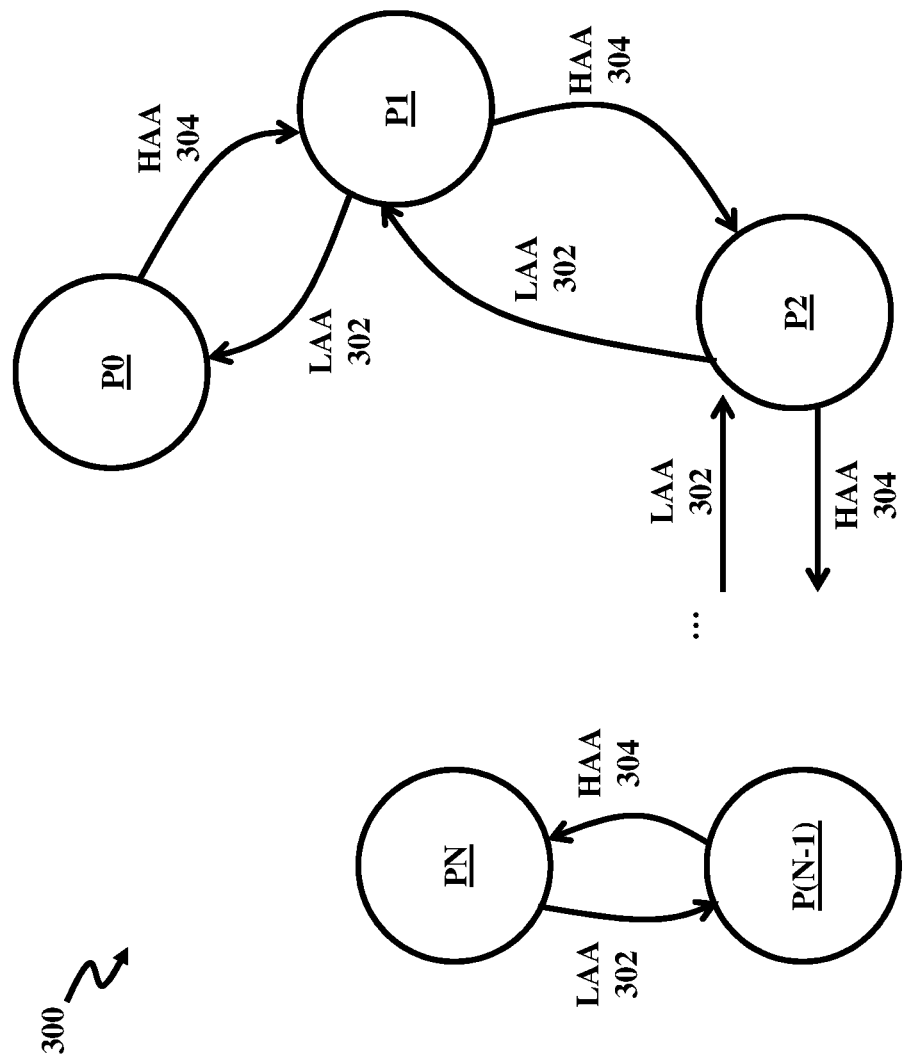
FIG. 3 is a schematic diagram illustrating a power management state transition diagram according to an embodiment herein.

FIG. 3, with reference to FIGS. 1 and 2, illustrates a device (such as 201 or 202, 203, 204, 205) power state transition diagram 300, according to an embodiment herein. In an embodiment herein, the device power state transition diagram 300 uses transition events Low Application Activity (LAA 302) and High Application Activity (HAA 304) to illustrate how a device (e.g. 201 in our discussion) moves between power states. In embodiment herein, the rules for determining the transition events LAA 302 and HAA 304 are as follows:
(a) If the device 201 (for example) is less-active for the given set of applications, then a LAA 302 event is created and the device is moved to the next lower power state (in the power state range of P0, P1, P2, ... P(N−1), and PN, where P0 is the lowest and PN is the highest power state), if allowed by all applications.
(b) If some application is normally-active or very-active:
 f. Compute average value of the application parameter for all applications, for the device.
 g. If the average parameter value is greater than a multiplier k times the parameter-capacity, of the device in the given power state, then the HAA 304 is created and the device is moved to the next higher power state. For example, k=0.7 (or 70%) and if a Wi-Fi port's I/O rate exceeds 70% of the maximum I/O rate possible in the current power state, then the Wi-Fi device needs to move to next higher power state.

h. If the average parameter value is less than or equal to k times the parameter-capacity of the device in the given power state, then no event is created and no transition occurs.

As soon as the device is moved to a lower power state, the corresponding sensing threshold value (from Table VIII) is also decreased for the device's application parameter (for example Wi-Fi throughput rate threshold is reduced) for all applications, in proportion to the expected drop in performance due to lower power supplied to the device 101.

Similarly, as soon as the device 201 is moved to a higher power state, the corresponding sensing threshold value is increased for the device's ASP (for example Wi-Fi throughput rate threshold is increased) for all applications, in proportion to the expected increase in performance due to higher power supplied to the device. The evaluation and state transition process may be done at following times:

a) At the expiry of timers (or timeouts) specified explicitly by the user. Timer examples are "display timeout", "display timeout+5 minutes", "standby timeout", etc., and b) Periodically when sampling interval ticks.

The user may configure the standby timer in the IPM agent. Whenever this timeout happens all application sensors are scanned for specific applications, for example applications A, B and C. If standby is allowed for all applications (Table VII, Column 1), then the system is moved to the standby state which corresponds to the lowest power state of the system (P0 for all devices).

If some of the entries in the application sensor list indicate that standby is not allowed for an application, but allow active standby, then the system is moved to active standby state which means moving all the devices to their respective permissible lowest running power state of Table VI without actually putting the system to sleep and without allowing these applications to abruptly and undesirably terminate. Permissible lowest power state for the device is calculated as maximum of the minimum power state for application A, the minimum power state for application B, and the minimum power state for application C.

During active standby, the system goes into a deep power saving mode, using an energy saving algorithms without shutting down or suspending the system or any user application or devices. For example, the CPU may be allowed to be in P2 or higher and network ports may be allowed P1 or higher power level so that all active network connections are not disturbed. Even if the network connections are not active, the device is moved the lowest power state P1 or higher so that a system application is able to receive incoming connection requests. In an embodiment herein, a user may prefer active standby instead of normal standby as part of the IPM power saving policy for the system being used. Active standby may be invoked under any one of the following circumstances:

(a) After a pre-defined idle timeout occurs. For example, standby timeout, or five minutes after the display timeout that causes the display to turn off, or ten minutes after standby timeout (if the device is still active), and (b) immediately after the device generates an event such as lock screen or when system's battery below 10% with no external source of power, according to an exemplary embodiment.

An event is communicated by an external system to an application running on the device. And based on a schedule (at any scheduled time), the device may go to active standby or wake up from active standby.

An embodiment herein uses an observation interval (ObsIntvl) during which any time duration in which there are no user inputs to the device are monitored and collected. In other words, user inactivity duration values are collected during ObsIntvl. This can be done periodically for every ObsIntvl elapsed in time. Let S stand for this observed data set. For example, S=[4, 9, 10, 15, 25, 30, 12] where each number is in minutes and an ObsIntvl of 6 hours, from 10 am to 4 pm of a day is used, ignoring previous day's data.

Let A be the current value (also known as prior value) for the display timeout (DTO), which is user inactivity timeout after which the display is turned off without making user feel that he is affected by the system action. In other words, user does not mind if display is turned off because the user is not likely to interrupt with an input as soon as the display goes off.

The aim is, given data S which includes fresh data collected after the last time A was computed (A's prior value) and DTO is updated, a posterior value of A is chosen such that:

a) If the user was unaffected with current value of A, he/she will continue to be unaffected with new (posterior) lesser value of A, i.e. if the display goes off sooner as per new posterior value of A.

b) If the user was not comfortable with display going off, then the new value of A is increased such that the user will become more comfortable as the display will go off later because of the new posterior value of A.

For example, if a user inactivity timeout is ten minutes (prior value) the new estimate may be eight or twelve minutes (posterior value). In the implementation of the embodiment, the updating happens in increments over many iterations every time based on additional data along with old data at each iteration. Whenever a display timeout occurs and display goes off, but the user immediately reacts to it by interacting with the system, then the timeout is intrusive and the timeout was not successful or rejected by user. Based on observed data, DTO can be reduced, not changed or increased after every ObsIntvl.

Let CurDTO be the current value of DTO and let NewDTO represent new desired DTO value. The set S of inactivity durations observed are in the ObsIntvl. It is then verified whether the NewDTO can be less than the CurDTO. This is the most desirable goal as this will save power consumption in the device. All DTO numbers are positive integers in minutes. For all durations durnx and durny in S, there is a subset of S defined by S1={all durnx such that durnx>NewDTO} and similarly S2={all durny such that durny>CurDTO}. Note that S2 is a subset of S1. Every durny in S2 will also cause a successful timeout after the display time out is set to NewDTO. For example: with S={6, 7, 8, 10, 11, 10, 9, 15, 25, 12}, CurDTO=10 and NewDTO=8 results in S1={10,12,11, 10, 9, 15, 25} i.e. all durations in S>8 and S2={11,15,25,12} i.e. all durations in S>10.

Let's assume count(S) depicts the size of the set S. Statistically, count(S2)/count(S1) represents the probability that a durnx in S1 will timeout successfully because every durnx in S1 is also a member of S2. If this probability is high, then one can set CurDTO=NewDTO for the system and observe inactivity durations during next ObsIntvl and repeat the same set of computations. For example, if count (S2)/count(S1)>0.6 (i.e. some $Threshold_1$>0.5) then one can set CurDTO=NewDTO. Therefore, if probability of all durations in S being greater than the current timeout value divided by the probability of all durations in S being greater than a proposed lesser new timeout value is greater than a predetermined threshold minus 1, then the DTO can be changed to the new timeout value.

In an embodiment herein, it is also verified whether the NewDTO should be more than CurDTO. If count(S2) divided by count(S1) is less or equal to the predetermined $Threshold_1$, then the power saving is intruding into user experience and it should be evaluated whether the NewDTO has to be more than CurDTO in order to reduce intrusion into user experience. Therefore, by increasing the DTO chances of successful timeouts should be much better compared to success attained with CurDTO. If this is not true, the DTO is not increased. For example, let inactivity durations recorded during an ObsIntvl and earlier be D={5, 6, 6, 5, 7, 8, 9, 10, 7, 7, 11, 12, 9, 13, 25}. First any inactivity duration in D that is less than CurDTO is filtered out, since no timeout takes place for this duration. Therefore S={7, 8, 9, 10, 7, 7, 11, 12, 9, 13, 25}, and count(S)=11. Let CurDTO=7 and proposed NewDTO=8. Then S1={8, 9, 10, 11, 12, 9, 13, 25}, i.e. all durations in S>7, and S2={9, 10, 11, 12, 9, 13, 25}, i.e. all durations in S>8. Count(S1)/count(S) represents the probability of a duration (durn) to be greater than CurDTO, and in an example it is equal to 8/11=0.727. Similarly, the probability of duration being greater than NewDTO equals to count(S2)/count(S), and in our example equals to 7/11 or 0.636.

If the probability of (durn>CurDTO)/P(durn>NewDTO) is greater than a configurable $Threshold_2$, which statistically becomes Count (S1)/Count(S2) being greater than the $Threshold_2$, then one can set the display timeout to be NewDTO. In this example, since $(0.875/0.636) > Threshold_2$ (for example 1.2) one can set the display timeout to NewDTO value of 8. If there is no case for increasing DTO then the DTO remains at CurDTO and is not changed.

The solution presented herein uses short term historical data that is collected during the last N hours of time where N can a number in the range of few hours (e.g. 8) to many hours corresponding to last few days (e.g. 72). In an embodiment herein, the steps for determining the timeout are:
1. Divide a day into 1 or more observation intervals.
2. Collect user inactivity duration data during all the observation intervals of a day.
3. Store data every day and maintain history for last predetermined number of intervals.
4. At the end of an observation interval use the latest data collected and part of the data from previous observation intervals. For example, 50% of previous observation interval data can be used and the rest discarded.
5. Based on the data that is finalized, predict the timeout values to be used during the next observation interval. These new timeout values are set in power management policy of the system.

Figure 4:
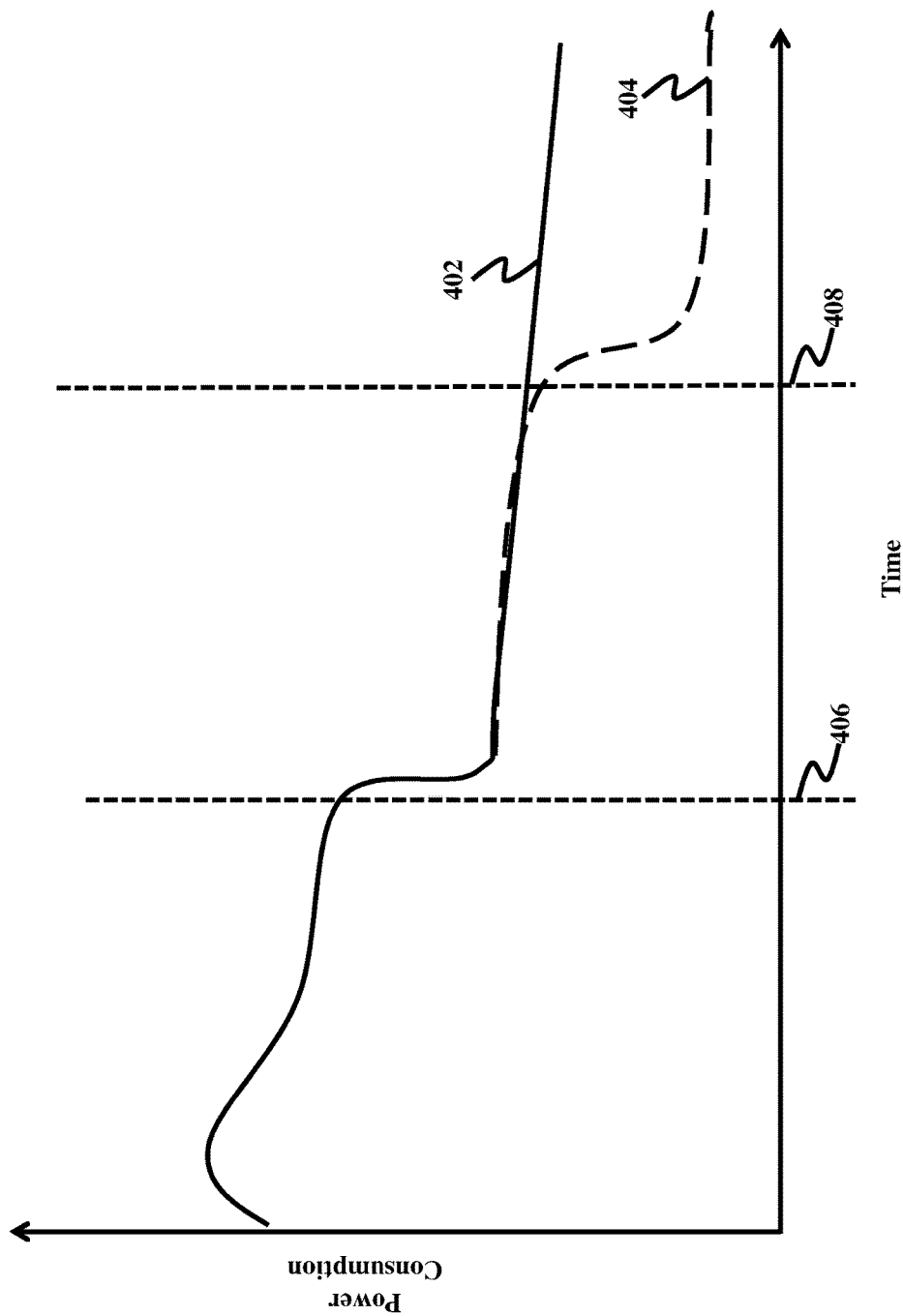
FIG. 4 is a graph illustrating the impact of active standby in reducing power consumption according to an embodiment herein.

FIG. 4, with reference to FIGS. 1 through 3, is a graph illustrating an impact of active standby in reducing idle power consumption in the device 101, according to an exemplary embodiment herein. Solid curve 402 illustrates power consumption with no active standby allowed according to the rules in AST. Dashed curve 404 illustrates power consumption with active standby allowed, according to an exemplary embodiment herein. Vertical dashed line 406 illustrates when the display timeout occurs. The vertical dashed line 408 illustrates when the standby timeout occurs. FIG. 4 illustrates the lower power consumption of the device 101 when the active standby is allowed even when the device 101 is not going into standby, according to the embodiments herein.

Figure 5A:
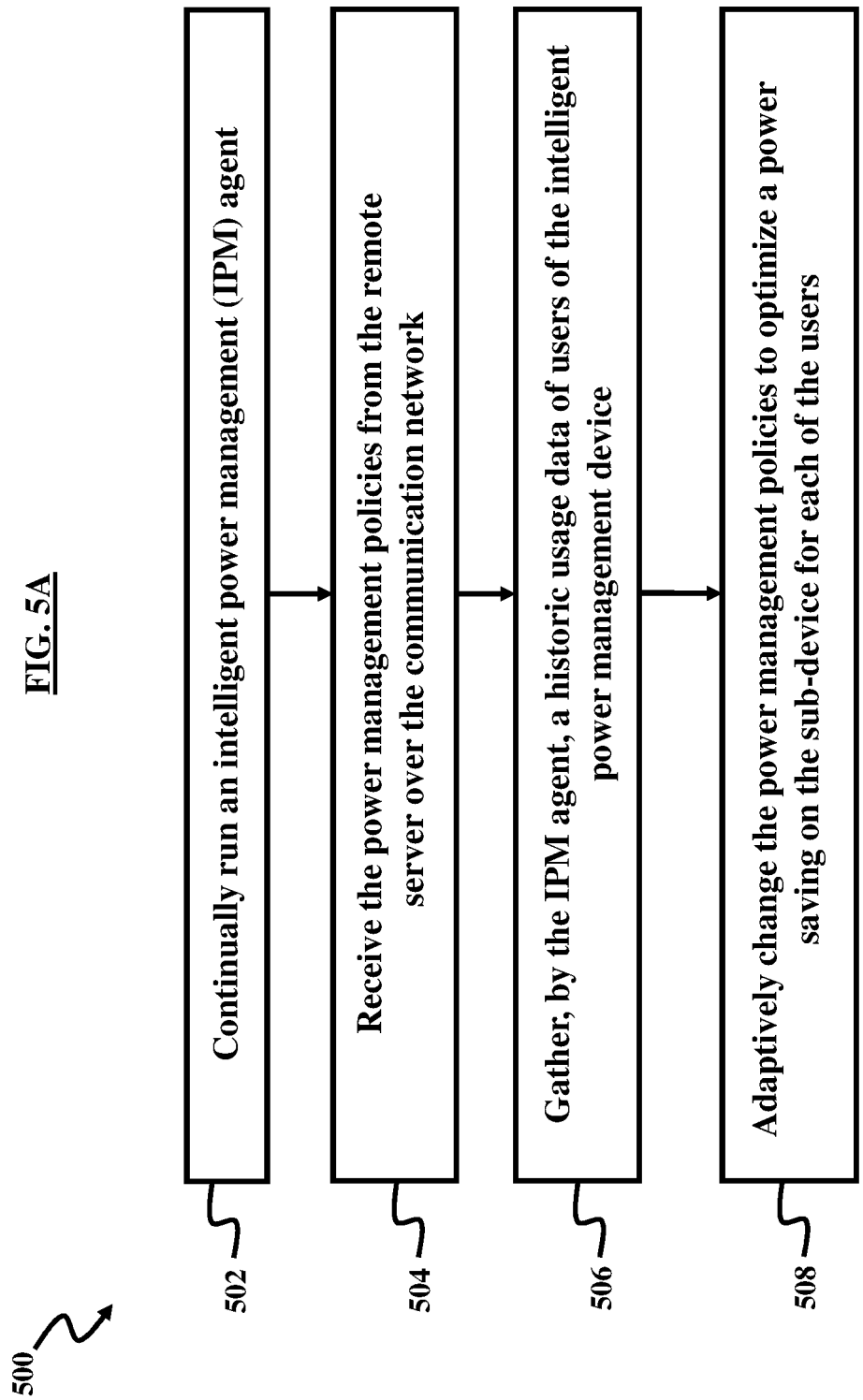
FIG. 5A is a flow diagram illustrating a method for intelligently managing a power consumption of a device according to an embodiment herein.

FIG. 5A, with reference to FIGS. 1 through 4, illustrates a flow diagram illustrating a method 500 for intelligently managing a power consumption of a device 101 including a plurality of sub-devices and communicatively connected to a remote server 103 according to an embodiment herein. At step 502, the method 500 may continually run an intelligent power management (IPM) agent, wherein the IPM agent is configured to reduce the power consumption on the intelligent power management device 101 based on power management policies that include power management actions for controlling power consumption of a sub-device of the device 101. At step 504, the method 500 may receive the power management policies from the remote server 103 over a communication network 102. At step 506, the method 500 may gather, by the IPM agent, a historic usage data of users of the intelligent power management device 101. At step 508, the method 500 may adaptively change the power management policies to optimize a power saving on the sub-device for each of the users.

Figure 5B:
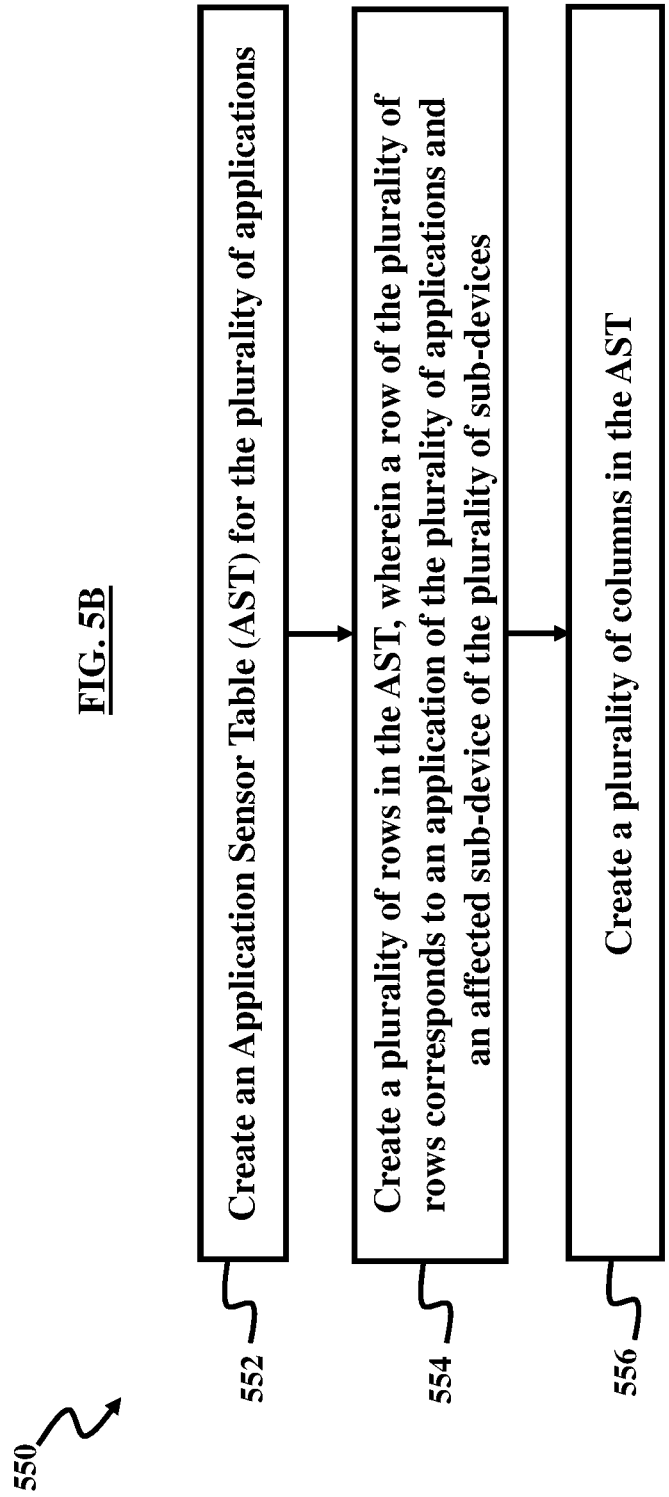
FIG. 5B is a flow diagram illustrating a method for intelligently managing a power consumption of a device according to an embodiment herein.

FIG. 5B, with reference to FIGS. 1 through 5A, illustrates a flow diagram illustrating a method 550 for managing a power consumption of an intelligent power management device 101 running a plurality of independent applications, wherein the intelligent power management device 101 includes a plurality of sub-devices. At step 552, the method 550 may creating an Application Sensor Table (AST) for the plurality of applications. At step 554, the method 550 may create a plurality of rows in the AST, wherein a row of the plurality of rows corresponds to an application of the plurality of applications and an affected sub-device of the plurality of sub-devices. At step 554, the method 550 may create a plurality of columns in the AST. The plurality of columns in the AST may include a first column corresponding to a power management action on the affected sub-device, a second column corresponding to a regular standby permission indicating whether the power management action is permitted to include a regular standby mode, and a third column corresponding to an active standby permission indicating whether the power management action is permitted to include an active standby mode, wherein the active standby mode allows the affected sub-device to continue operating in a permissible minimal power state without allowing any of the plurality of applications to terminate, and wherein the permissible minimal power state for the affected sub-device includes a maximum of a plurality of minimum power states for the affected sub-device allowed by each of the plurality of applications.

Embodiments herein provide active standby that works on all hardware and OS platforms, and does not require any changes to legacy applications. In an embodiment herein, when an application is running in the system, an IPM agent observes the resource consumption pattern of the application and sub-devices such as:
  a) CPU usage—min, max and average percentage utilization, as well as the type of the CPU load.
  b) Input devices that are being used.
  c) Display device, and whether an application currently uses the display.
  d) Network communication ports used such as Wi-Fi, Ethernet, USB, and the communication protocols that the application uses such as HTTP, TCP, UDP, as well as the frequency and duration of usage.
  e) Hard disk usage, including min, max, and average I/O data rate.

f) Whether an application is automatically started when the System boots up.

g) Whether an application terminates when the system goes to standby and whether that application is immediately restarted by the user after termination. If so the application allows only active standby.

In an embodiment herein, the IPM agent collects the device usage pattern for every important and frequently running user application including well-known applications such as e-mail, browser etc., using the OS provided run-time API, system commands, and stores data. Based on this data, the application sensor list is created automatically. For example, when a remote connection client is used to connect to a server, IPM agent observes and decides that the network communication port is heavily used, and so it cannot be put to standby or hibernate state, but other sub-devices such as the display or the hard disk can be turned off.

An embodiment herein provides how to store and organize the user inactivity duration data in order to adaptively modify important timeouts such as display timeout or standby timeout. These timeout values help in achieving some of the goals of the embodiments herein, such as:

a) The system adaptively modifies the timeout values by learning from the user behavior from user inactivity point of view.

b) Timeout values are the smallest possible values without the user getting affected during his/her usage of the system.

As used in embodiments herein, input/output devices may include any of: keyboard/mouse, biometric-sensor, camera, touch screen, pen/stylus, voice, motion/proximity sensors, and thermal sensor.

In an embodiment herein, users may be in different groups with different system usage patterns and different power management policies may be provided for different groups. An embodiment herein observes the inactivity durations of each user and dynamically changes the timeouts per user to optimize power savings on the device. A goal of embodiments herein is to maximize power savings by continuously learning about inactivity or idleness pattern of user and accordingly adapting the timeout values without affecting user experience.

The embodiments herein may be embodied as a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon. Such non-transitory computer readable storage media can be any available media that can be accessed by a special purpose device, including the functional design of any special purpose processor as discussed above.

By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose device to perform a certain function or group of functions. Computer-executable instructions also include program modules that are executed by computers in stand-alone or network environments. Generally, program modules include routines, programs, components, data structures, objects, and the functions inherent in the design of special-purpose devices, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, and may be configured, for example, as a kiosk.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
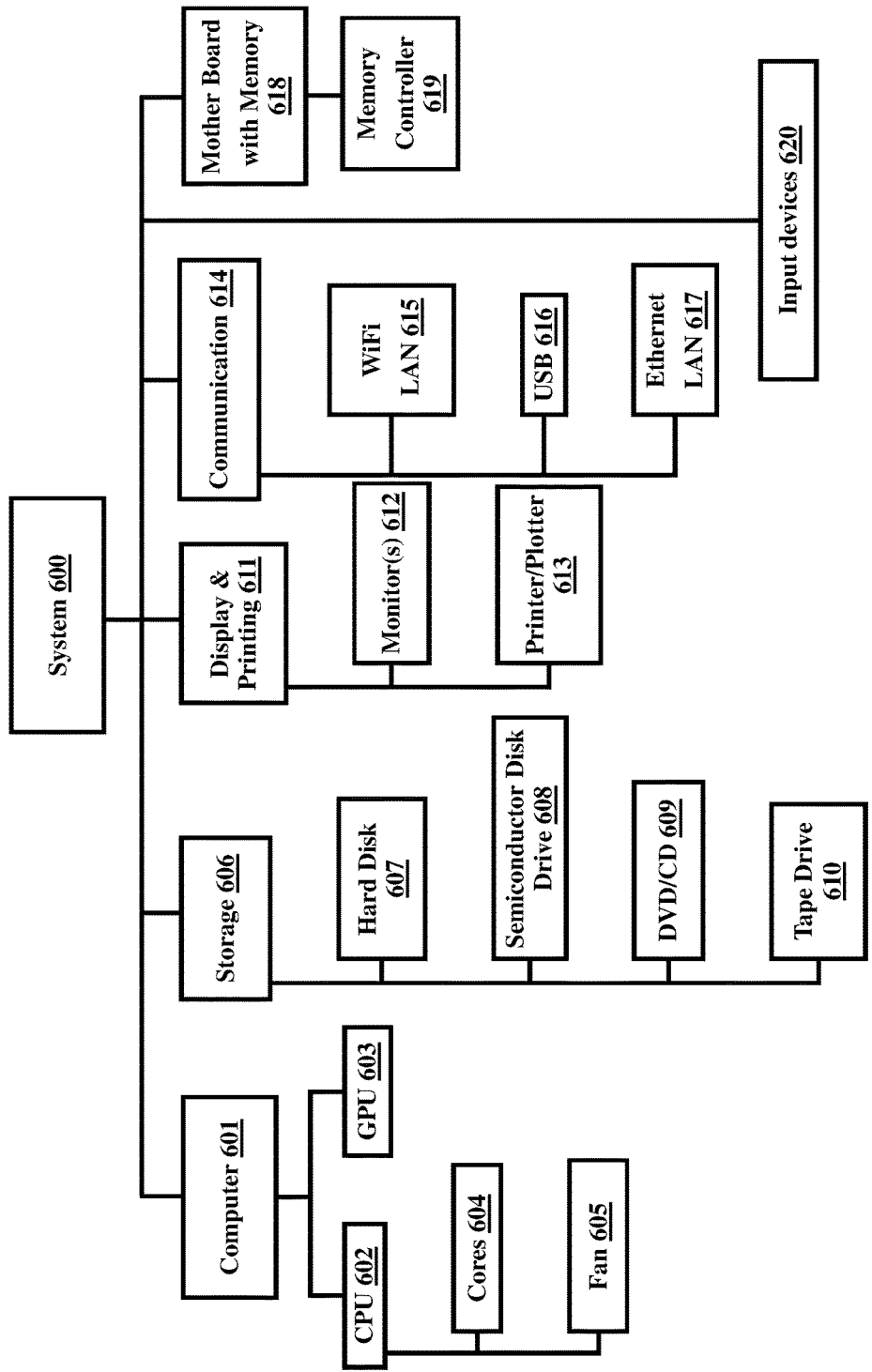
FIG. 6 is a schematic diagram illustrating a device hierarchy according to an embodiment herein.

A representative hardware environment illustrating device/sub-devices (or components) organizational or functional hierarchy for practicing the embodiments herein is depicted in FIG. 6, with reference to FIGS. 1 through 5. This schematic drawing illustrates an organizational and functional hierarchy of hardware configuration of an information handling/computer system 600 in accordance with the embodiments herein.

At a first hierarchy level, the system 600 comprises at least one compute sub-device 601. The compute sub-device 601, at the next hierarchical level may comprise a CPU 602 and a GPU 603 sub-devices communicatively connected to the compute sub-device 601. At the next hierarchical level, the CPU 602 may include and communicatively connect to cores 604 sub-devices. And at next hierarchical level, the CPU 602 may include a fan 605 sub-device.

The system 600 may also include a storage 606 at the first hierarchy. At the next hierarchical levels, the storage 606 may include a hard disk 607, a semiconductor disk drive 608, a DVD/CD drive 609, and a tape drive 610 sub-devices, communicatively connected to each other. The system 600 may include a display and printing device 611 at the first hierarchical level. The display and printing device 611 may include monitors 612, and printer/plotters 613 sub-devices at the next hierarchical levels, communicatively connected to each other. The system 600 may include a communication device 614 at the first hierarchical level. The communication device 614 may include a Wi-Fi LAN adaptor 615, USB 616, and an Ethernet LAN adaptor 617 at the next hierarchical levels, communicatively connected to each other. The system 600 may include a motherboard with memory 618 at the first hierarchical level and a memory controller at the next hierarchical level, communicatively connected to the motherboard 618. The system 600 may further include input devices 620. Input devices 620 may include any of keyboard, mouse, touch screen, camera, and gyroscope, according to an embodiment herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system comprising:
   an intelligent power management device comprising:
      a plurality of sub-devices comprising:
         a central processing unit (CPU);
         a display device communicatively connected to said CPU;
         a main memory component accessed by said CPU; and
         a persistent storage connected to said memory component and accessed by said CPU;
      an operating system controlling said CPU;
      a communication component communicatively connected to said CPU and configured to connect said intelligent power management device to a communication network;
   a remote server communicatively connected to said communication network,
   wherein said operating system is configured to continually run an intelligent power management (IPM) agent, wherein said IPM agent is configured to save power consumption on said plurality of sub-devices based on a plurality of power management policies,
   wherein a power management policy of said plurality of power management policies comprise power management actions for controlling power consumption of a sub-device among said plurality of sub-devices,
   wherein said power management policy is received from said remote server over said communication network,
   wherein said IPM agent is configured to adaptively change, using historic usage data of a plurality of users of said intelligent power management device, said power management actions to optimize a power saving on said plurality of sub-devices for each of said plurality of users,
   wherein said intelligent power management device is configured to:
      determine, using said IPM agent, that said sub-device is active when said IPM agent detects an interaction by any of said plurality of users with said sub-device, or is idle when said IPM agent detects no interaction by any of said plurality of users with said sub-device; and
      store, using said IPM agent, a plurality of records indicating the activeness and idleness for said sub-device in an interacting devices idle duration table, wherein said plurality of records comprises a duration of the activeness or idleness and any of a date, a time, a day, a geographic location, a time zone, a temperature, a humidity, a luminescence, a network signal strength, an electromagnetic field radiation, and energy consumption of said sub-device during the activeness or idleness, wherein said intelligent power management device is configured to determine, using said IPM agent and said plurality of records in said interacting devices idle duration table, a plurality of timeouts for said sub-device, wherein a timeout of said plurality of timeouts indicates a value for a timer for said sub-device, and wherein when said timer reaches a predetermined time, a predetermined action of said plurality of actions from said power management policy occurs, wherein said display device is configured to display a value of said timeouts and said timer for said sub-device, wherein said intelligent power management device is further configured to update, using said IPM agent, said value of said timeouts, and upon an overwrite by said user, to a value of an input received from said user, wherein said sub-device is configured to operate in multiple power states from P0 to PN, wherein N is an integer, P0 is a lowest power level, and PN is a highest power level corresponding to said sub-device, and wherein said IPM agent is further configured to move said sub-device to a power state from P0 to PN based on a plurality of sub-device dynamic performance demands and said records in said interacting devices idle duration table, and wherein a sub-device performance demand of said plurality of sub-device performance demands is determined using a performance demand table corresponding to an application running on said intelligent power management device, wherein said performance demand table comprises a plurality of rows, wherein each row corresponds to an affected sub-device of said plurality of sub-devices, wherein said affected sub-device is affected by said application, said row comprises:

an application sensing parameter corresponding to said application and said affected sub-device, wherein said application sensing parameter indicates a performance measure of said application;

a sensing threshold corresponding to said application and said affected sub-device;

a sampling interval configured to indicate a time to periodically sample and measure said application sensing parameter of said application on said affected sub-device; and an observation number indicating a number of continuous observations on said application during said sampling interval for measuring said application sensing parameter, wherein said power state of said affected sub-device moves to a higher power state when said application sensing parameter is higher than said sensing threshold, and wherein said power state of said affected sub-device moves to a lower power state when said application sensing parameter is lower than said sensing threshold.

2. A method for intelligently managing a power consumption of a device comprising a plurality of sub-devices communicatively connected to a remote server, the method comprising:

continually running an intelligent power management (IPM) agent, wherein said IPM agent is configured to reduce said power consumption on said intelligent power management device based on power management policies, and wherein a power management policy of said plurality of power management policies comprise power management actions for controlling power consumption of a sub-device of said plurality of sub-devices, wherein said sub-device is configured to operate in multiple power states from P0 to PN, and wherein N is an integer, P0 is a lowest power level, and PN is a highest power level corresponding to said sub-device;

receiving said power management policies from said remote server over said communication network;

gathering, by said IPM agent, a historic usage data of a plurality of users of said intelligent power management device;

adaptively changing said power management policies to optimize a power saving on said sub-device for each of said plurality of users;

determining that said sub-device is active, when said IPM agent detects an interaction by any of said plurality of users with said sub-device, or is idle, when said IPM agent detects no interaction by any of said plurality of users with said sub-device; and storing, by said IPM agent, a plurality of records indicating the activeness and idleness for said plurality of sub-devices in an interacting devices idle duration table, wherein said plurality of records further comprises a duration of the activeness or idleness and any of a date, a time, a day, a geographic location, a time zone, a temperature, a humidity, a luminescence, a network signal strength, an electromagnetic field radiation, and energy consumption of said plurality of sub-devices during the activeness or idleness;

determining, by said IPM agent, using said plurality of records in said interacting devices idle duration table, a plurality of timeouts for said plurality of sub-devices, wherein a timeout of said plurality of timeouts indicate a value for a timer for said sub-device, and wherein when said timer reaches a predetermined time, a predetermined action from said power management policies occur;

displaying, using a display device, a value of said timeouts, and said timer for said sub-device;

updating said value of said timeouts, by said IPM agent and upon an overwrite by said user, to a value of an input received from said user;

moving said sub-device to a power state from P0 to PN based on a plurality of sub-device performance demands and said records in said interacting devices idle duration table;

receiving a demand table from said remote server, said demand table comprising:

a sampling interval configured to indicate a time to measure a resource demand of an application using any of said plurality of sub-devices;

an application sensing parameter configured to store said resource demand of said application; and a sensing threshold configured to trigger a change in said power state of each of said sub-device, wherein said power state of said sub-device moves to a higher power state if said application sensing parameter is greater than said sensing threshold; and wherein said power state of said sub-device moves to a lower power state if said application sensing parameter is less than said sensing threshold; and determining each of said plurality of sub-device performance demands using said demand table corresponding to each of said plurality of sub-devices.

3. A method for managing a power consumption of an intelligent power management device running a plurality of independent applications, wherein said intelligent power management device comprises a plurality of sub-devices, said method comprising:
creating an Application Sensor Table (AST) for said plurality of applications;
creating a plurality of rows in said AST, wherein a row of said plurality of rows corresponds to an application of said plurality of applications and an affected sub-device of said plurality of sub-devices; and
creating a plurality of columns in said AST, said plurality of columns comprising:
a first column corresponding to a power management action on said affected sub-device;
a second column corresponding to a regular standby permission indicating whether said power management action is permitted to comprise a regular standby mode; and
a third column corresponding to an active standby permission indicating whether said power management action is permitted to comprise an active standby mode, wherein said active standby mode allows said affected sub-device to continue operating in a permissible minimal power state without allowing any of said plurality of applications to terminate, and wherein said permissible minimal power state for said affected sub-device comprises a maximum of a plurality of minimum power states for said affected sub-device allowed by each of said plurality of applications.

4. The method of claim 3, further comprising:
receiving a predetermined timeout for said affected sub-device from a user of said intelligent power management device; and
configuring said affected sub-device to enter said active standby mode after said timeout, when said active standby permission permits said power management action to comprise said active standby mode and when said regular standby permission does not permit said power management action to comprise said regular standby mode.

5. The method of claim 3, further comprising:
receiving a predetermined timeout for said affected sub-device from a user of said intelligent power management device; and
configuring said affected sub-device to enter said active standby mode after a predetermined time delay after said timeout provided said active standby permission column permits said affected sub-device to enter said active standby mode when said active standby permission permits said power management action to comprise said active standby mode and when said regular standby permission does not permit said power management action to comprise said regular standby mode.

6. The method of claim 3, further comprising configuring said affected sub-device to enter said active standby mode when a battery level of said intelligent power management device is below a predetermined threshold when said active standby permission permits said power management action to comprise said active standby mode and when said regular standby permission does not permit said power management action to comprise said regular standby mode.

7. The method of claim 3, further comprising:
receiving a use schedule for said affected sub-device from a user of said intelligent power management device; and
configuring said affected sub-device to enter said active standby mode outside said use schedule provided said active standby permission column permits said affected sub-device to enter said active standby mode when said active standby permission permits said power management action to comprise said active standby mode and when said regular standby permission does not permit said power management action to comprise said regular standby mode.

* * * * *